US00RE35054E

United States Patent [19]

Chikamatsu et al.

[11] E Patent Number: Re. 35,054

[45] Reissued Date of Patent: Oct. 10, 1995

[54] TANK INTERNAL PRESSURE-DETECTING DEVICE FOR INTERNAL COMBUSTION ENGINES

[75] Inventors: Masataka Chikamatsu; Masayoshi Yamanaka; Hiroshi Maruyama; Shigetaka Kuroda; Kazutomo Sawamura, all of Wako, Japan

[73] Assignee: Honda Giken Kogyo Kabushiki Kaisha, Tokyo, Japan

[21] Appl. No.: 270,778

[22] Filed: Jul. 5, 1994

Related U.S. Patent Documents

Reissue of:

[64] Patent No.: 5,267,547
Issued: Dec. 7, 1993
Appl. No.: 5,993
Filed: Jan. 19, 1993

[30] Foreign Application Priority Data

Jan. 20, 1992 [JP] Japan ..... 4-28860

[51] Int. Cl.[6] ..... F02M 33/02

[52] U.S. Cl. ..... 123/519

[58] Field of Search ..... 123/518, 519, 123/520, 521; 73/118.1

[56] References Cited

U.S. PATENT DOCUMENTS

| | | | |
|---|---|---|---|
| 4,926,825 | 5/1990 | Ohtaka et al. | 123/520 |
| 5,021,071 | 6/1991 | Reddy | 123/518 |
| 5,143,035 | 9/1992 | Kayanuma | 123/520 |
| 5,146,902 | 9/1992 | Cook et al. | 123/518 |
| 5,158,054 | 10/1992 | Otsuka | 123/198 D |
| 5,182,945 | 2/1993 | Setter | 73/118.1 |
| 5,186,153 | 2/1993 | Steinbrenner et al. | 123/198 D |
| 5,191,870 | 3/1993 | Cook | 123/198 D |
| 5,193,512 | 3/1993 | Steinbrenner et al. | 123/198 D |
| 5,195,498 | 3/1993 | Sieble et al. | 123/520 |
| 5,197,442 | 3/1993 | Blumenstock et al. | 123/198 D |
| 5,205,263 | 4/1993 | Blumenstock et al. | 123/518 |
| 5,220,898 | 6/1993 | Kidokoro et al. | 123/519 |
| 5,299,544 | 4/1994 | Kitomoto et al. | 123/198 D |
| 5,333,589 | 8/1994 | Otsuka | 123/520 |

*Primary Examiner*—Thomas N. Moulis
*Attorney, Agent, or Firm*—Nikaido, Marmelstein, Murray & Oram

[57] ABSTRACT

A tank internal pressure-detecting device for an internal combustion engine having an evaporative emission control system for controlling purging of evaporative fuel generated in a fuel tank thereof into an intake system thereof. An ECU interrupts purging of evaporative fuel by the evaporative emission control system for a predetermined period of time after the engine is started. The ECU causes control valves of the evaporative emission control system to open the interior of the fuel tank to the atmosphere, and stores a value of pressure within the fuel tank detected by a tank internal pressure sensor as a reference value while the purging is being interrupted and at the same time the interior of the fuel tank is opened to the atmosphere. The ECU corrects an output value of the tank internal pressure sensor, based upon the reference value stored.

16 Claims, 14 Drawing Sheets

TANK INTERNAL PRESSURE-DETECTING DEVICE FOR INTERNAL COMBUSTION ENGINES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a tank internal pressure-detecting device for detecting pressure within a fuel tank of an internal combustion engine, and more particularly to a tank internal pressure detecting device of this kind, which has a function of making a so-called zero point correction of an output from a sensor for sensing the pressure within the fuel tank.

2. Prior Art

Conventionaly, there has been widely used an evaporative fuel-processing system for internal combustion engines, which comprises a fuel tank, a canister having an air inlet port provided therein, a first control valve arranged across an evaporative fuel-guiding passage extending from the fuel tank to the canister, and a second control valve arranged across a purging passage extending from the canister to the intake system of the engine.

A system of this kind temporarily stores evaporative fuel in the canister, and then purges the evaporative fuel into the intake system of the engine.

Whether a system of this kind is normally operating can be checked, for example, by bringing the evaporative emission control system into a predetermined negative pressurized state, measuring a change in the pressure within the fuel tank (tank internal pressure) with the lapse of time after the evaporating emission control system has been brought into the predetermined negatively pressurized state, and determining whether the system is normally operating, from the measured tank internal pressure, as proposed by U.S. Ser. No. 07/942,875 assigned to the assignee of the present application.

The abnormality-determining system according to the earlier application includes a third control valve provided at the air inlet port of the canister, for closing and opening the same, tank internal pressure-detecting means for detecting pressure within the fuel tank, a first pressure change rate-detecting means for detecting a rate of change in the pressure within the fuel tank by controlling opening and closing of the first control valve, negatively-pressuring means for setting the evaporative emission control system to a predetermined negatively pressurized state by controlling opening and closing of the first to third control valves when the engine is operating a second pressure change rate-detecting means for detecting a range of change in the pressure within the fuel tank by closing the second control valve after the predetermined negatively pressurized state has been established, and abnormality-determining means for determining abnormality of the evaporative emission control system based upon results of detection by the first and second pressure change rate-detecting means.

According to the above-mentioned abnormality-determining manner, the rate of change in the pressure within the fuel tank is a rate of change of the pressure in the fuel tank which occurs in the direction toward a positive pressure side (positive pressure side) due to generation of evaporative fuel within the fuel tank, while the rate of change in the fuel tank pressure is a rate of change in the fuel tank pressure which starts from a negative pressure state by closing the second control valve, after the evaporative emission control system been brought into the predetermined negatively pressurized state (the pressure within the fuel tank and that within the canister have been made negative) by opening the second control valve (negative pressure side change). The two kinds of pressure change rates detected by the first and second pressure change rates detecting means are compared with each other to detect an abnormality in the evaporative emission control system (i.e. an mount of evaporative fuel leaking from the system).

However, according to the abnormality-determining manner, the output value of the tank internal pressure sensor can vary due to manufacturing tolerances, aging, etc. If the output value of the sensor detected at the point of inflection, i.e. at the point at which the output value changes from the positive pressure side to the negative pressure side or vice versa (zero point) deviates from the actual point of inflection, it is impossible to discriminate whether the pressure within the fuel tank is changing toward the positive pressure side or toward the negative pressure side, resulting in an inaccurate abnormality determination based upon the leakage mount from the evaporative emission control system, etc.

Further, if the zero point of the tank internal pressure sensor deviates from the proper one, the interior of the fuel tank, etc. can be excessively negatively pressurized during the negative pressurization wherein the interior of the evaporative emission control system is negatively pressurized.

SUMMARY OF THE INVENTION

It is the object of the invention to provide a tank internal pressure-detecting device for an internal combustion engine, which is capable of making a zero-point correction of the output value of the tank internal pressure sensor, thereby achieving accurate detection of the pressure within the fuel tank by the tank internal pressure sensor.

To attain the object, the present invention provides a tank internal pressure-detecting device for an internal combustion engine having a fuel tank, an intake system, and an evaporative emission control system for controlling purging of evaporative fuel generated in the fuel tank into the intake system, comprising:

tank internal pressure-detecting means arranged in the fuel tank for detecting pressure within the fuel tank;

purging interrupting means for interrupting purging of the evaporative fuel by the evaporative emission control system for a predetermined period of time after the engine is started;

opening means for opening the interior of the fuel tank to the atmosphere;

memory means for storing a value of the pressure within the fuel tank detected by the tank internal pressure-detecting means as a reference value while the purging interrupting means is interrupting the purging of the evaporative fuel into the intake system and at the same time the opening means opens the interior of the fuel tank to the atmosphere; and correcting means for correcting an output value of the tank internal pressure-detecting means, based upon the reference value stored in the memory means.

By virtue of the above arrangement a deviation of the zero-point of the output value of the tank internal pressure sensor can be corrected, whereby detection of the pressure within the fuel tank by the tank internal pressure-detecting means can be accurately carried out. As a result, if an abnormality in the evaporative emission control system is detected by the use of the tank internal pressure-detecting device according to the invention, it is possible to clearly discriminate whether the pressure within the fuel tank is changing toward the positive pressure side or toward the negative pressure side, thereby enabling accurate determination of abnormality of the evaporative emission control system. Moreover, it can be prevented that the interior of the fuel tank is excessively negatively pressurized during the negative pressurization for the abnormality determination.

Preferably, the tank internal pressure-detecting device according to the invention includes inhibiting means for inhibiting operations of the purging interrupting means, the opening means and the memory means when a temperature of the engine is higher than a predetermined value.

Preferably, the memory means stores the value of the pressure within the fuel rank detected by the tank internal pressure-detecting means as the reference value, when a second predetermined period of time has elapsed after the opening means started to open the interior of the fuel tank.

In a specific form of the invention, the tank internal pressure-detecting device according to the invention is used in an internal combustion engine having a fuel tank, an intake system, and an evaporative emission control system having a canister having an air inlet port formed therein. an evaporative fuel-guiding passage extending between the fuel tank and the canister, a first control valve arranged across the evaporative fuel-guiding passage for closing and opening the passage, a purging passage extending between the canister and the intake system, a second control valve arranged across the purging passage for closing and opening the purging passage, and a third control valve arranged at the air inlet port of the canister for closing and opening the air inlet port. The tank internal pressure-detecting device comprises:

tank internal pressure-detecting means for detecting pressure within the fuel tank;

valve control means for opening the first and third valves and at the same time closing the second control valve for a predetermined period of time after the engine is started;

memory means for storing a value of the pressure within the fuel tank detected by the tank internal pressure-detecting means as a reference value while the valve control means opens the first and third control valves and closes the second control valve; and correcting means for correcting an output value of the tank internal pressure-detecting means, based upon the reference value stored in the memory means.

By virtue of this arrangement, similar results to those mentioned above can be obtained.

Preferably, the tank internal pressure-detecting device according to the invention includes inhibiting means for inhibiting operation of the valve control means when a temperature of the engine is higher than a predetermined value.

Preferably, the memory means stores the value of the pressure within the fuel tank detected by the tank internal pressure-detecting means as the reference value, when a second predetermined period of time has elapsed after the value control means started the opening of the first and third control valves and the closing of the second control valve.

Also preferably, the memory means stores a learned value of values of the pressure within the fuel tank detected by the tank internal pressure-detecting means as the reference value.

The above and other objects, features, and advantages of the invention will be more apparent from the following detailed description taken in conjunction with the accompanying drawings.

BRIEF DESCKIPTION OF THE DRAWINGS

Figure 1:
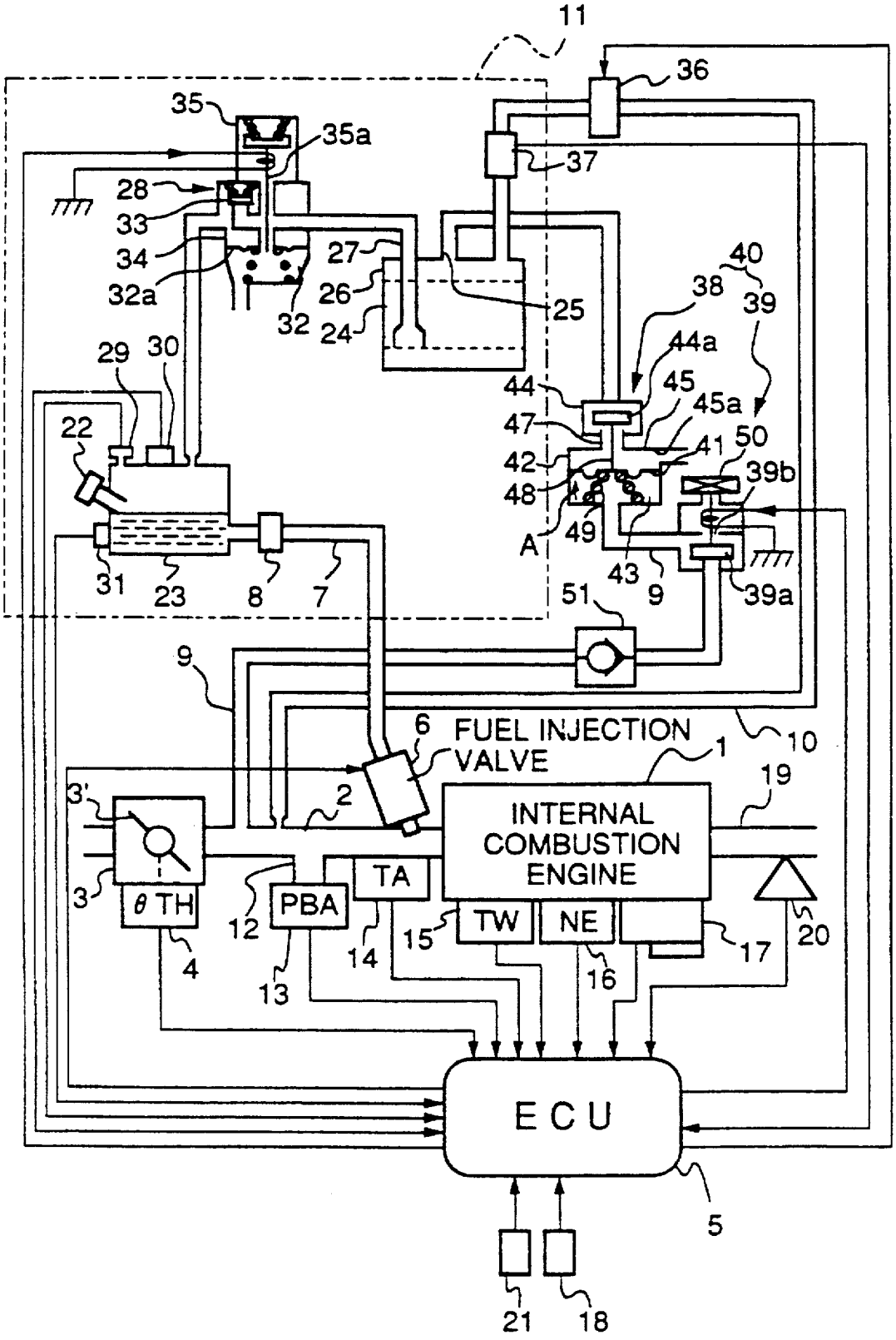
FIG. 1 is a block diagram showing the whole arrangement of an internal combustion engine and an evaporative fuel-procuring system therefor in which is incorporated a tank internal pressure-detecting device according to an embodiment of the invention.
Figures 3, 3A:
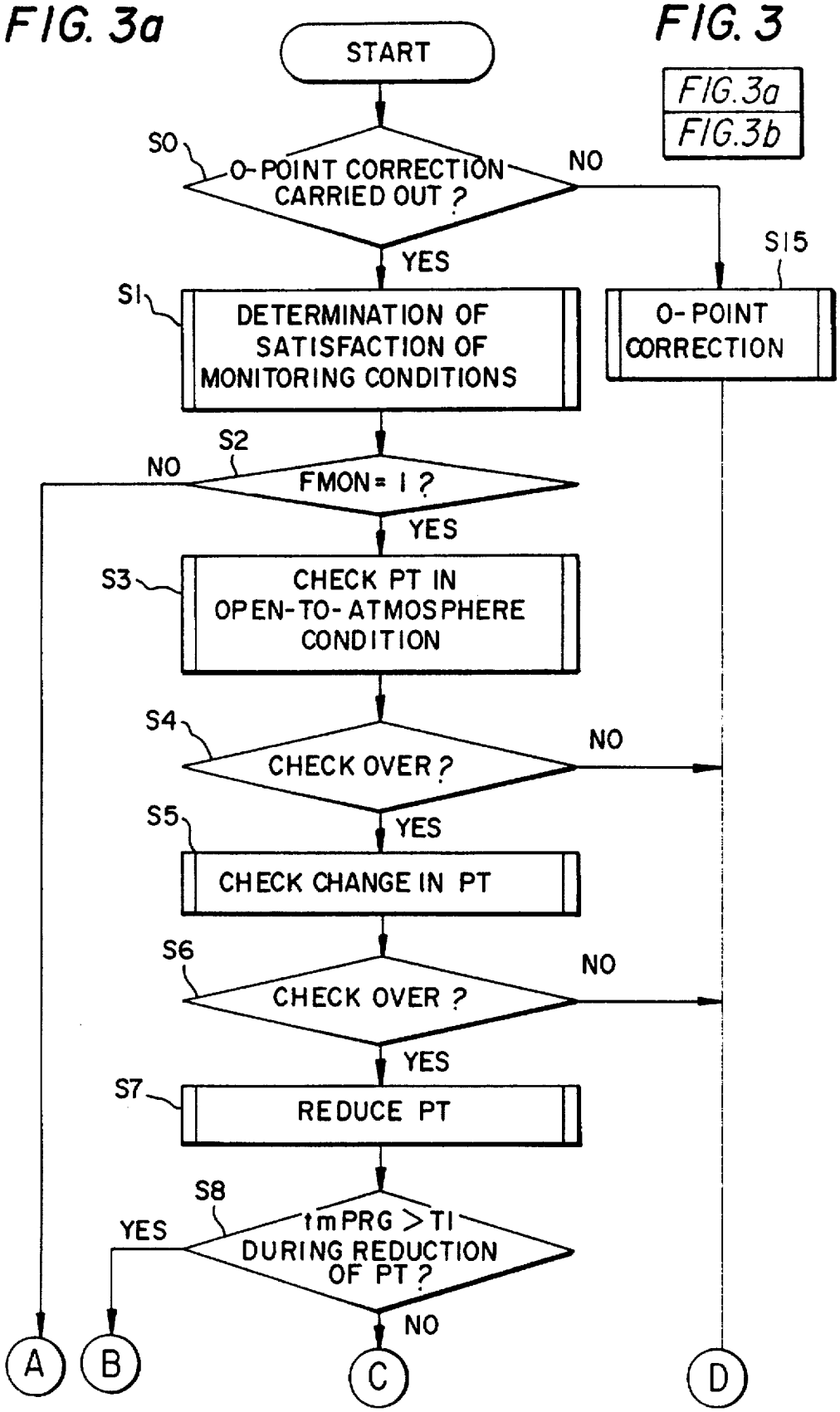
Figure 3B:
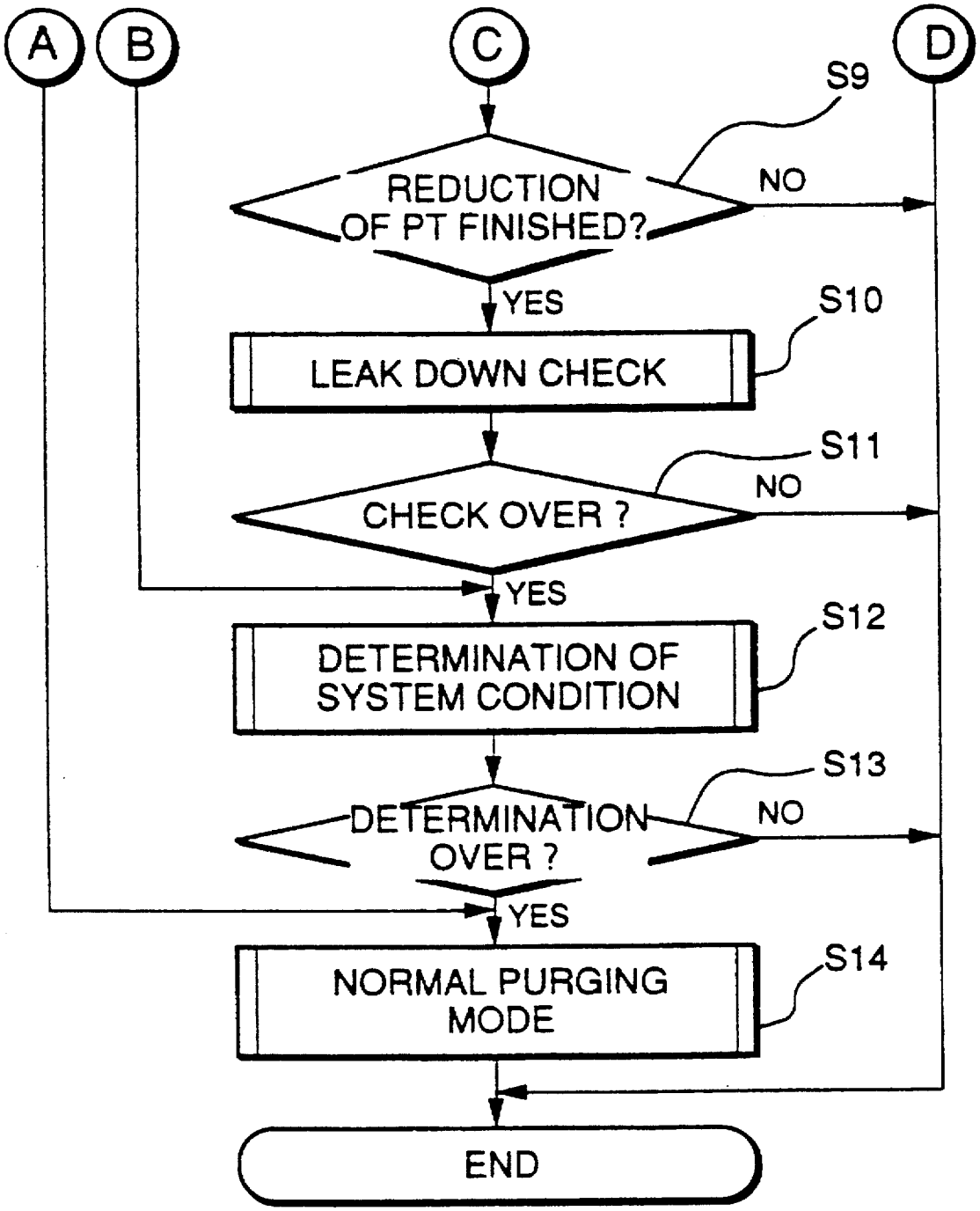
Figure 4:
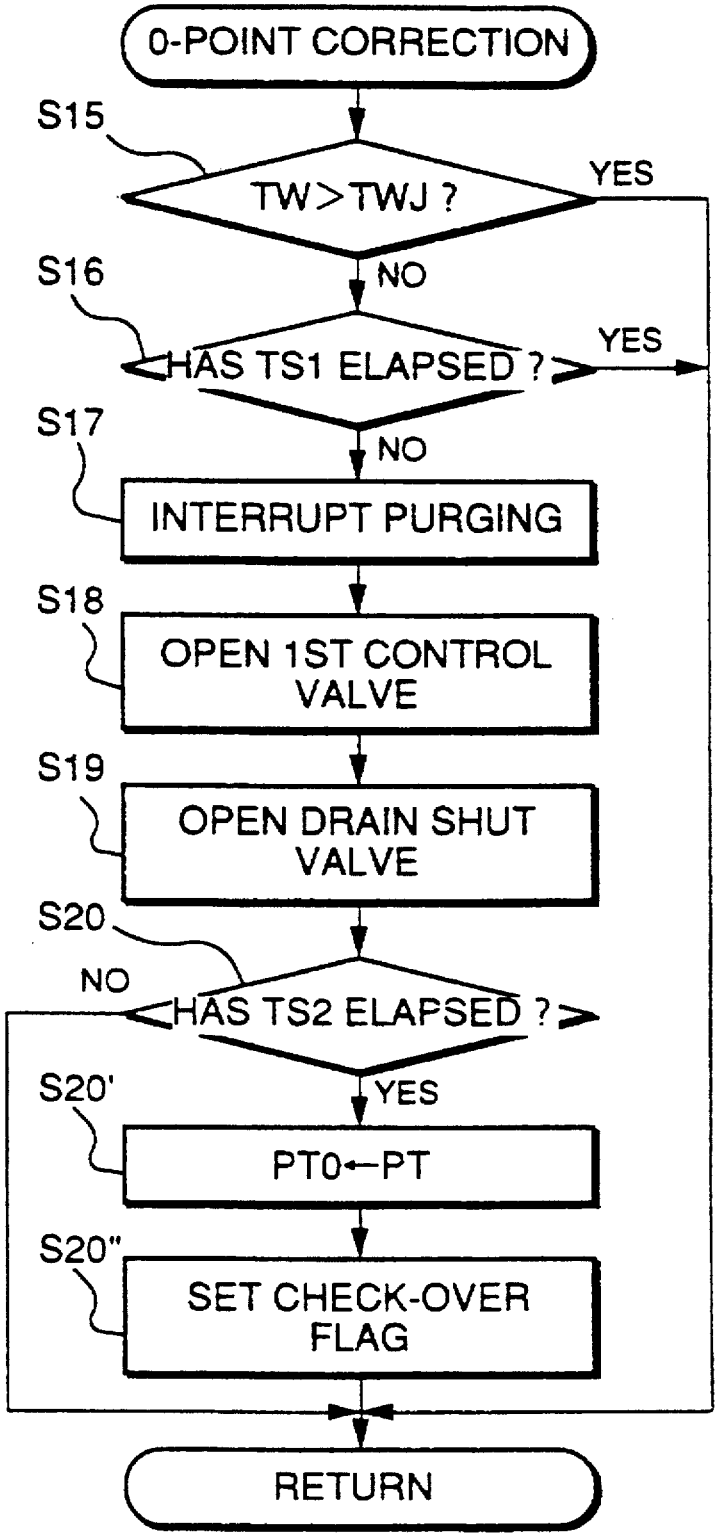
Figure 4A:
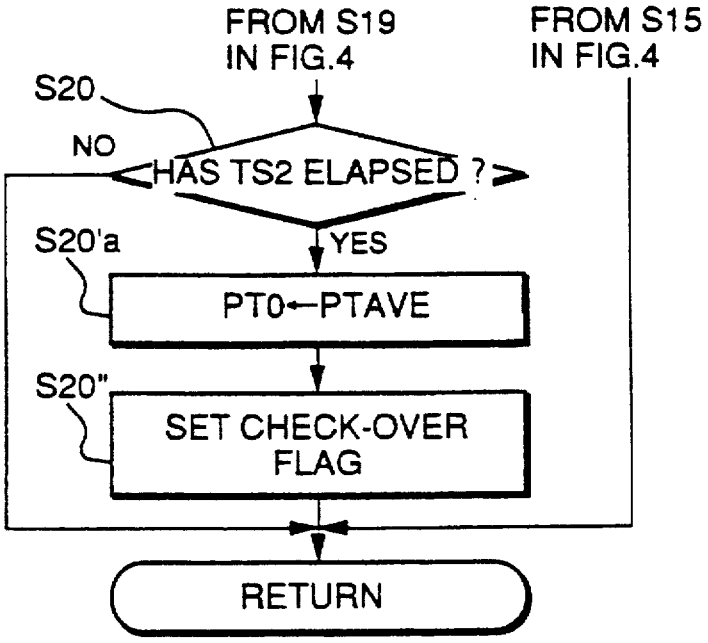
Figure 5:
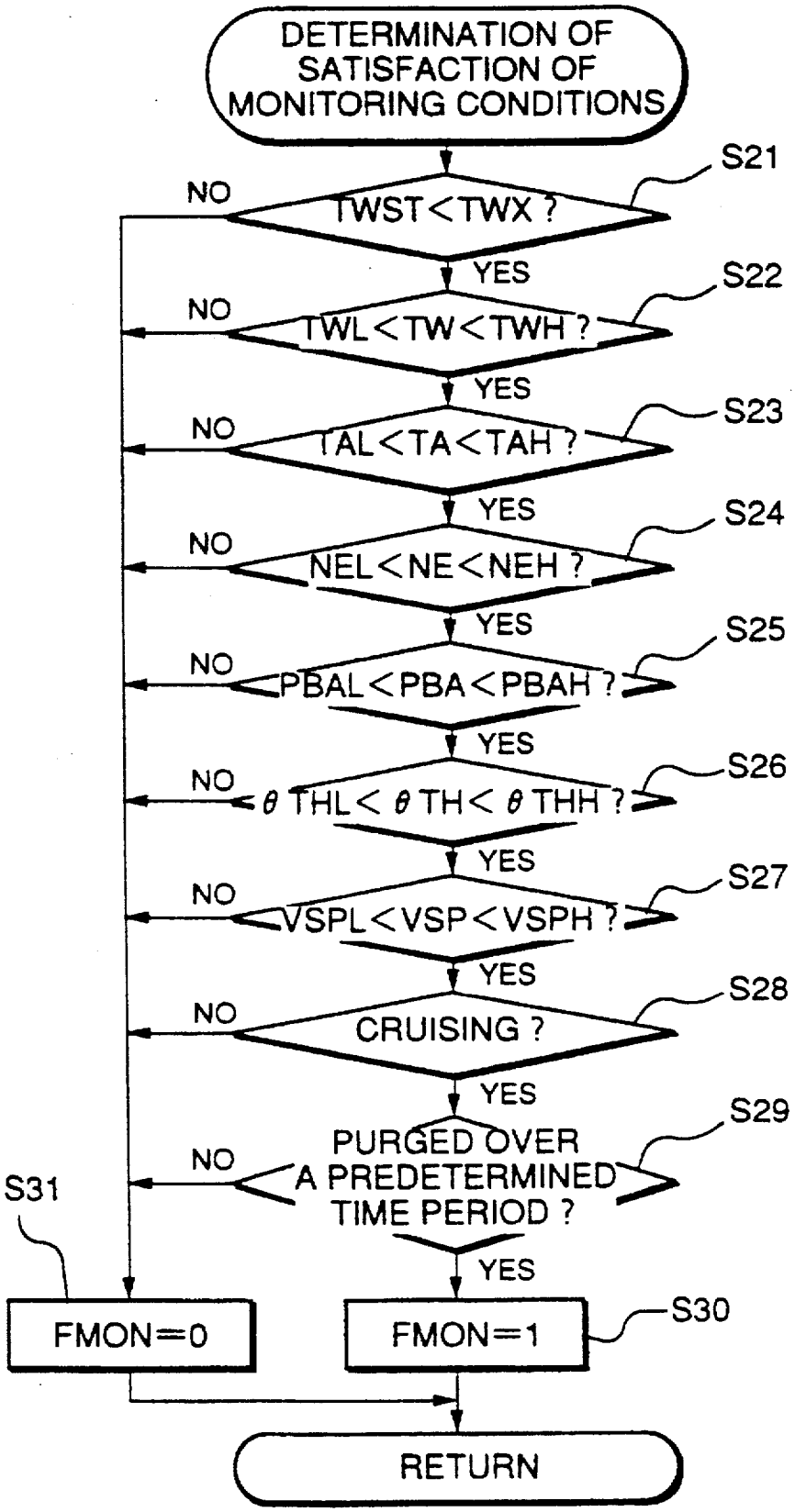
Figure 7:
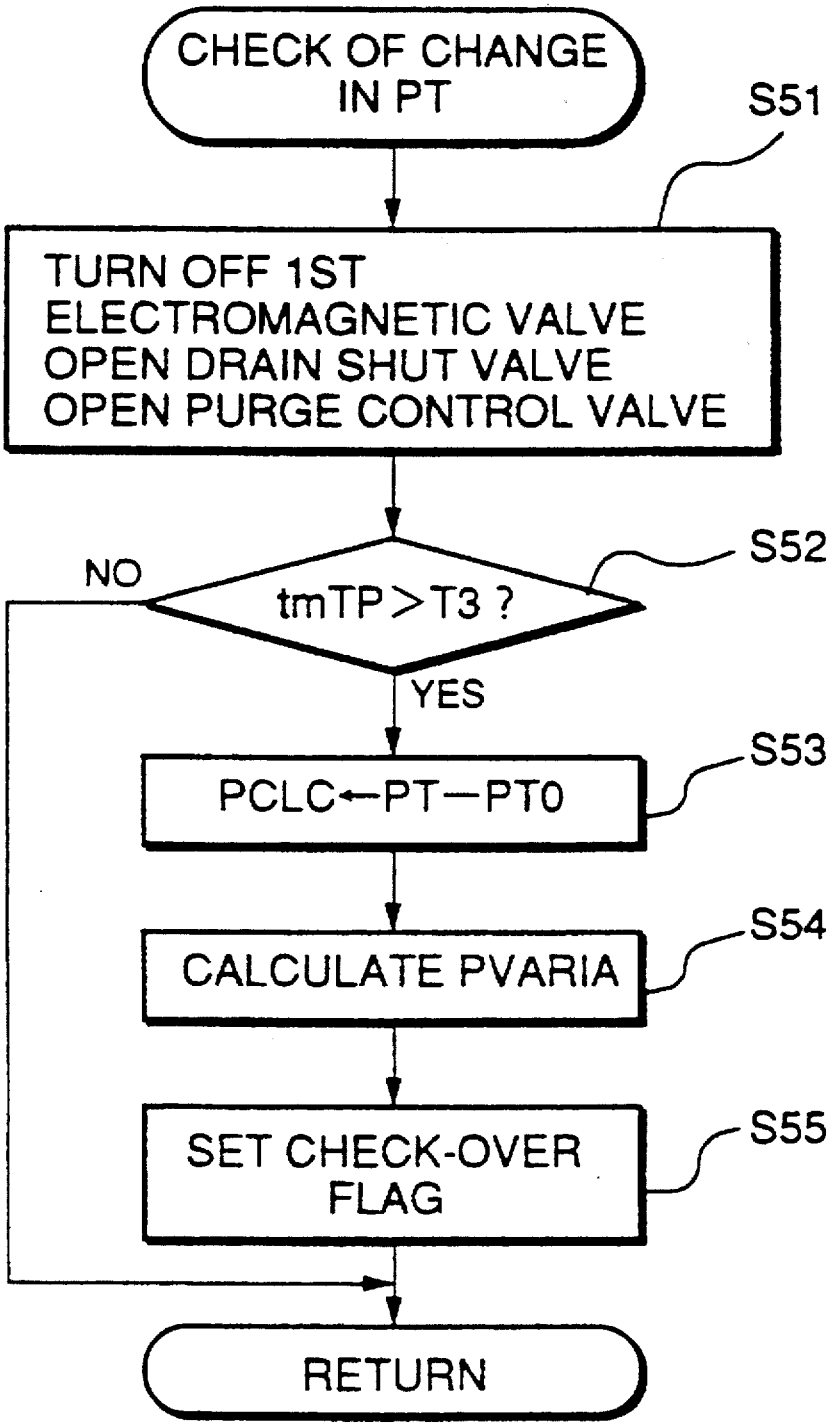
Figure 9:
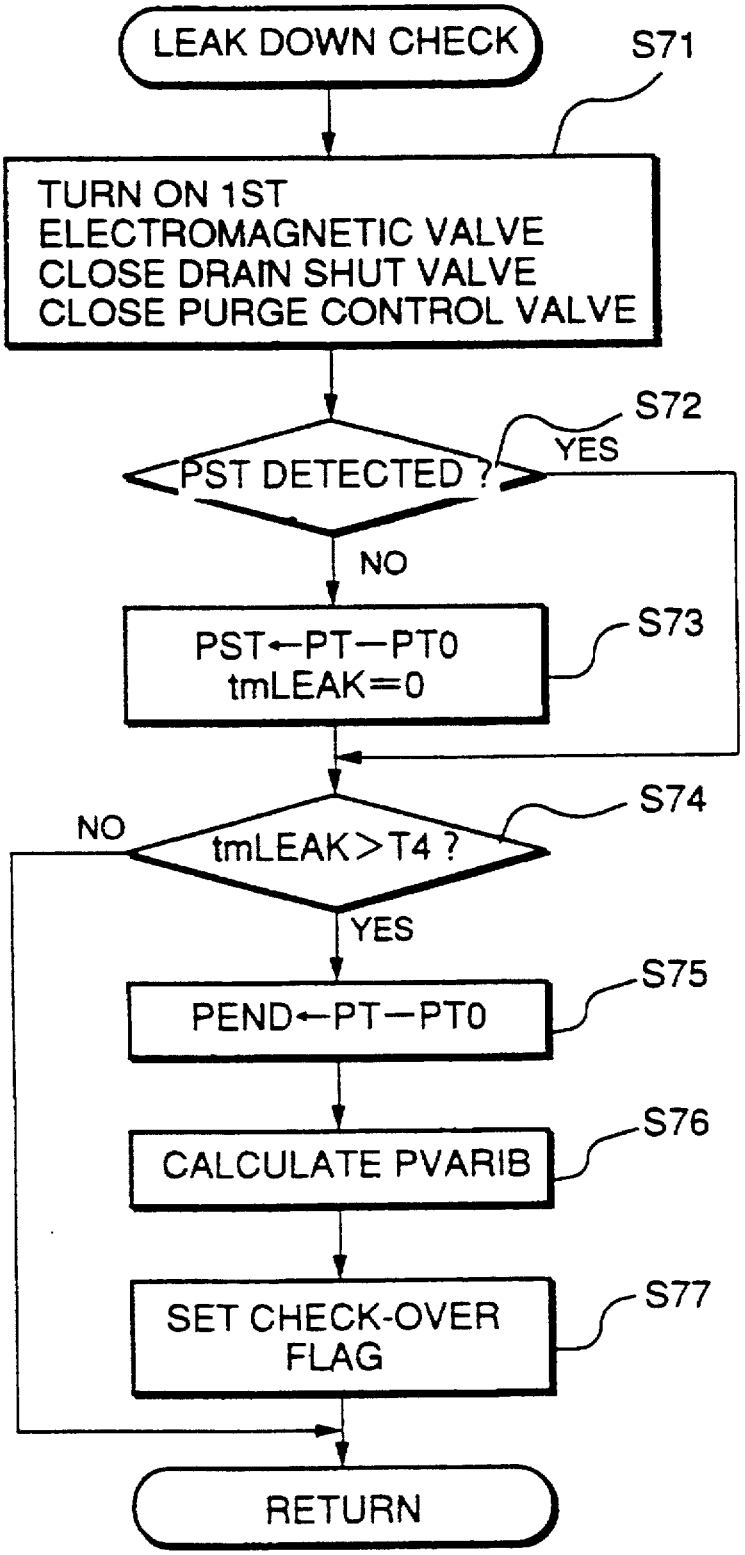
Figure 10:
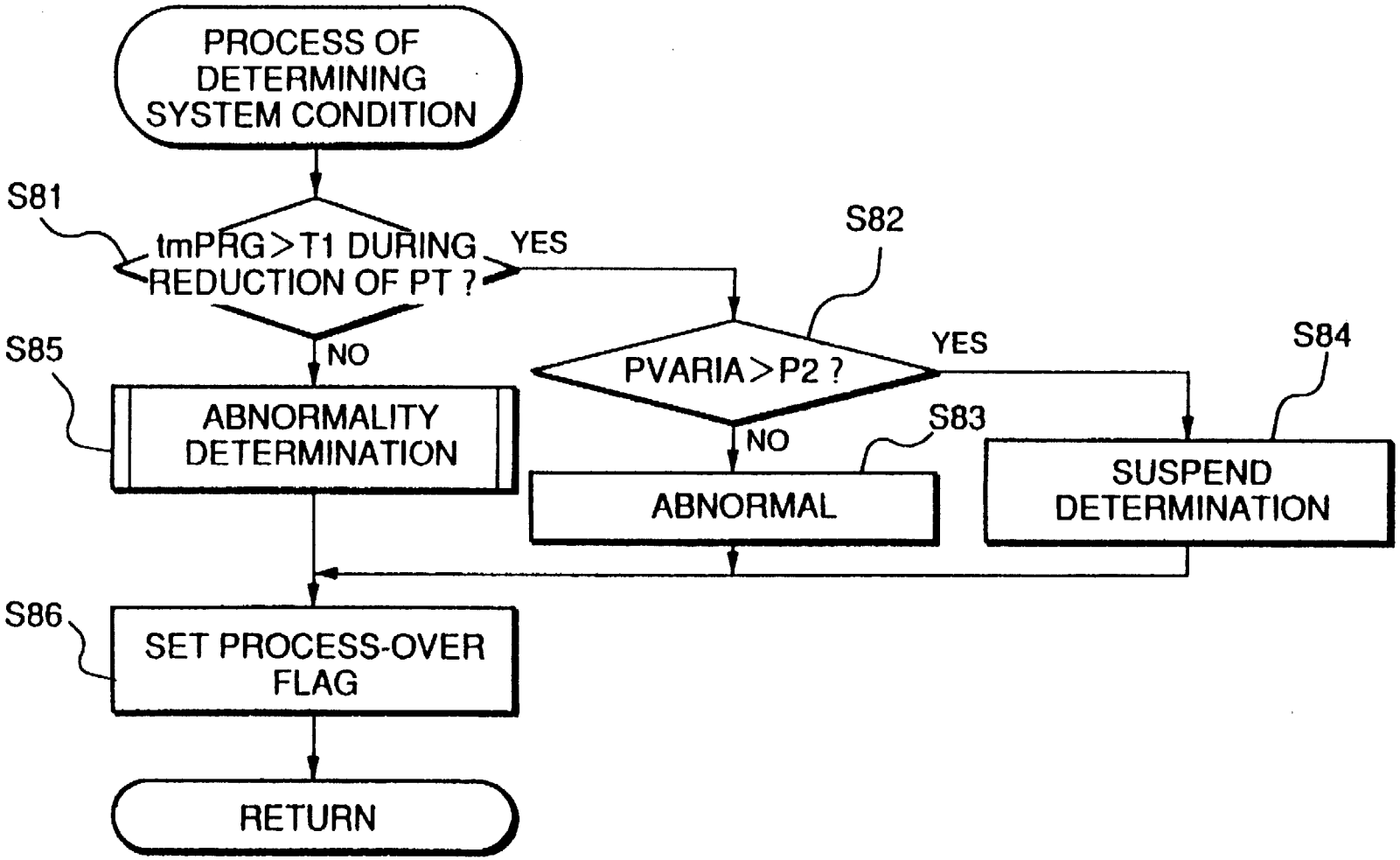
Figure 11:
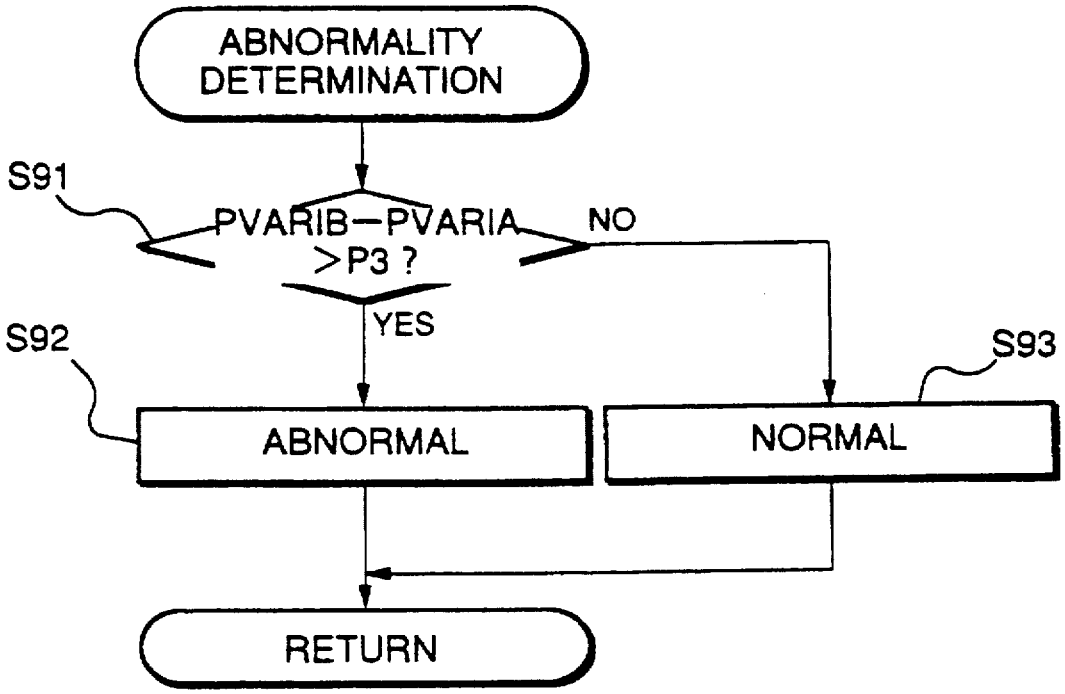
Figure 12:
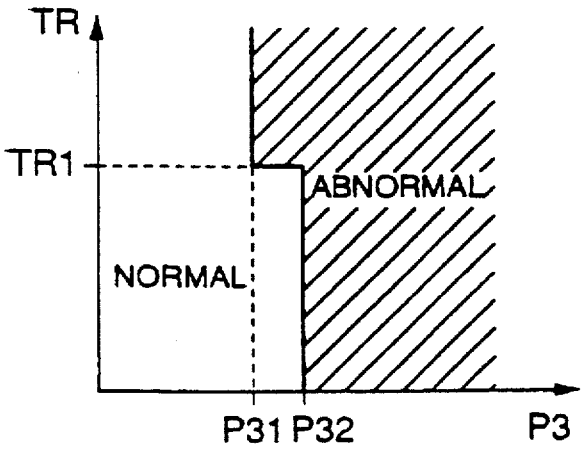
Figure 14:
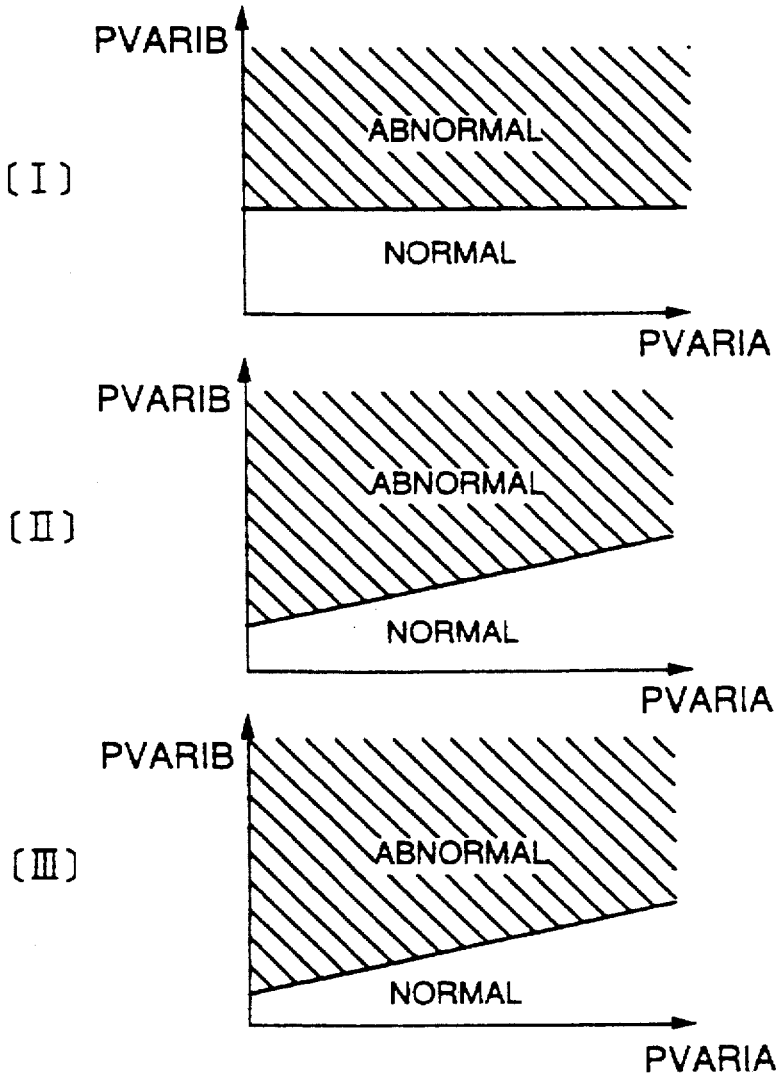
Figure 13:
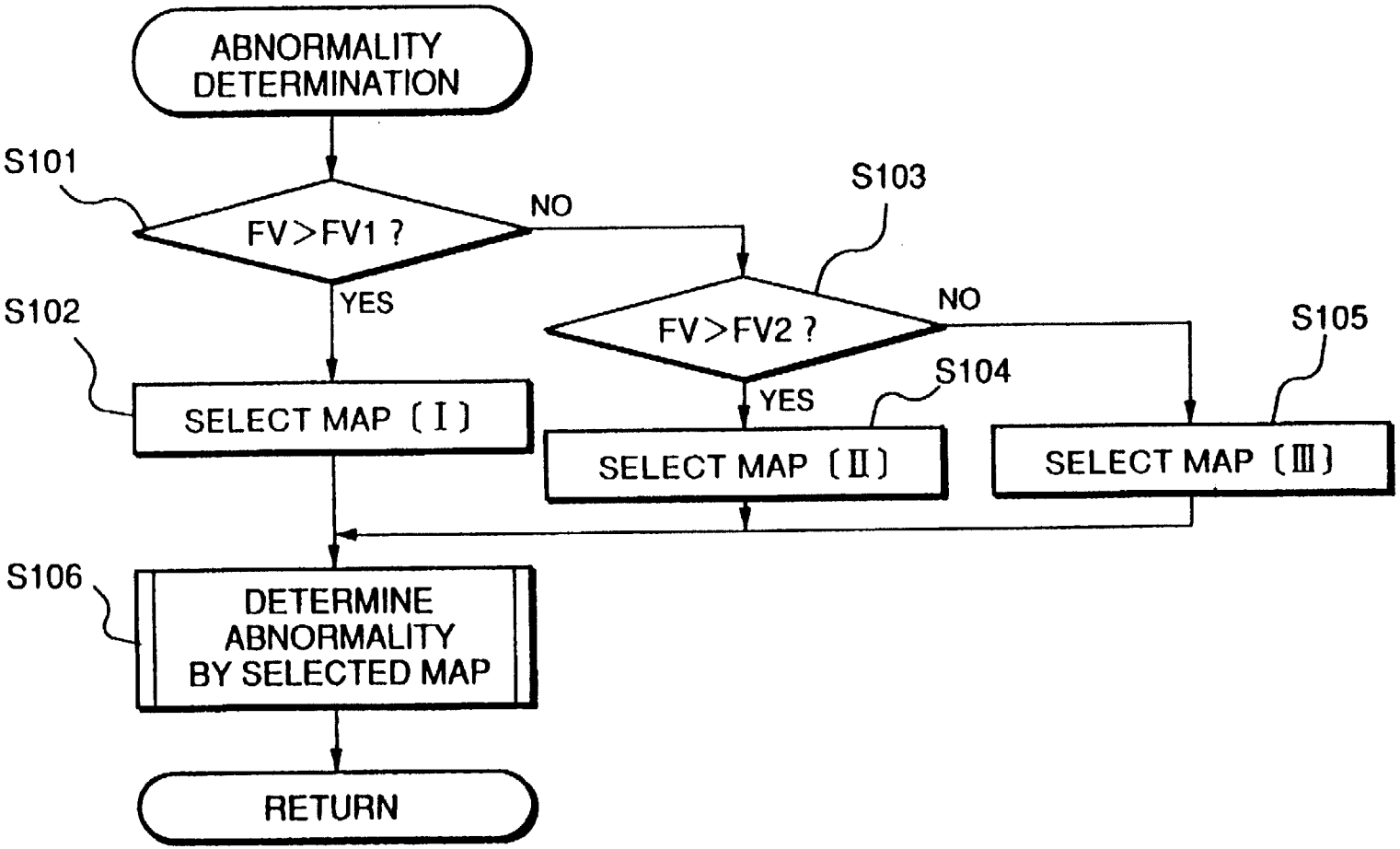

FIG. 3 *including FIGS. 3a and 3b*, is a flowchart showing part of a main routine for determining abnormality in an evaporative emission control system of the engine;

FIG. 4 is a flowchart showing a routine for making a zero-point correction of an output value of a PT sensor FIG. 1;

FIG. 4A is a flowchart showing part of a zero-point correction routine according to another embodiment of the invention;

FIG. 5 is a flowchart showing a routine for determining fulfillment of abnormality determining conditions; F1G. 6 is a flowchart showing a routine for checking pressure within a fuel tank in FIG. 1 (tank internal pressure) when the interior of the fuel tank is open to the atmosphere;

FIG. 7 is a flowchart showing a routine for checking changes in the tank internal pressure;

F1G. 8 is a flowchart showing a routine for reducing the tank internal pressure; FIG. 9 is a flowchart showing a leak down check routine for checking a change rate in the tank internal pressure when the evaporative emission control system is isolated from the intake pipe;

FIG. 10 is a flowchart showing a routine for determining a condition of the evaporative emission control system;

FIG. 11 is a flowchart showing a routine for determining abnormality in the system;

FIG. 12 shows a map used by the routine of FIG. 11;

F1G. 13 is a flowchart showing a routine for determining abnormality in the system according to another embodiment of the invention;

FIG. 14 shows a map used by the routine of FIG. 13; and

Figure 15:
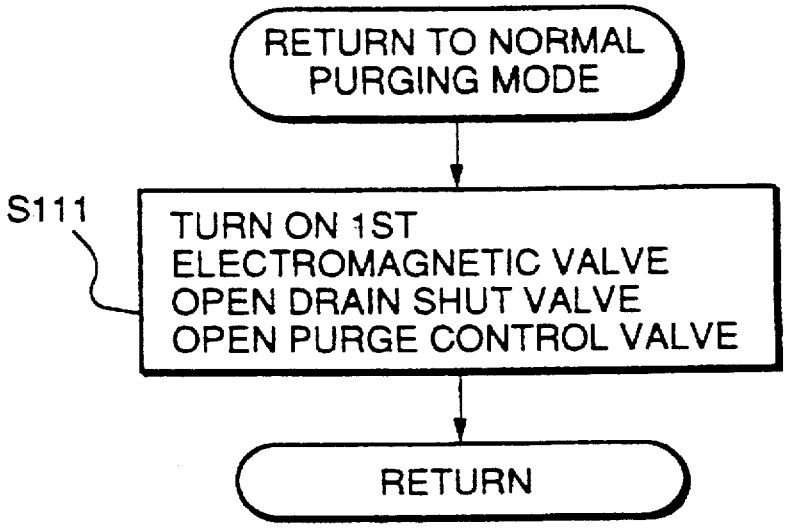

FIG. 15 is a flowchart showing a routine for carrying out normal purging.

DETAILED DESCRIPTION

The invention will now be described in detail with reference to the drawings showing embodiments thereof.

Referring first to FIG. 1, there is illustrated the whole arrangement of an internal combustion engine and an evaporative fuel-processing system therefor, in which is incorporated a tank internal pressure-detecting device according to an embodiment of the invention.

In the figure, reference numeral 1 designates an internal combustion engine (hereinafter simply referred to as "the engine") having four cylinders not shown, for instance. Connected to the cylinder block of the engine 1 is an intake pipe 2 across which is arranged a throttle body 3 accommodating a throttle valve 3' therein. A throttle valve opening (θTH) sensor 4 is connected to the throttle valve 3' for generating an electric signal indicative of the sensed throttle valve opening and supplying same to an electronic control unit (hereinafter referred to as "the ECU") 5.

Fuel injection valves 6, only one of which is shown, are inserted into the interior of the intake pipe 2 at locations intermediate between the cylinder block of the engine 1 and the throttle valve 3' and slightly upstream of respective intake valves, not shown. The fuel injection valves 6 are connected to a fuel pump 8 via a fuel supply pipe 7, and electrically connected to the ECU 5 to have their valve opening periods controlled by signals therefrom.

A negative pressure communication passage 9 and a purging passage 10 open into the intake pipe 2 at respective locations downstream of the throttle valve 3', both of which are connected to an evaporative emission control system 11, referred to hereinafter.

Further, an intake pipe absolute pressure (PBA) sensor 13 is provided in communication with the interior of the intake pipe 2 via a conduit 12 opening into the intake passage 2 at a location downstream of an end of the purging passage 10 opening into the intake pipe 2, for supplying an electric signal indicative of the sensed absolute pressure PBA within the intake pipe 2 to the ECU 5.

An intake air temperature (TA) sensor 14 is inserted into the intake pipe 2 at a location downstream of the conduit 12, for supplying an electric signal indicative of the sensed intake air temperature TA to the ECU 5.

An engine coolant temperature (TW) sensor 15 formed of a thermistor or the like is inserted into a coolant passage filled with a coolant and formed in the cylinder block, for supplying an electric signal indicative of the sensed engine coolant temperature TW to the ECU 5.

An engine rotational speed (NE) sensor 16 is arranged in facing relation to a camshaft or a crankshaft of the engine 1, neither of which is shown. The engine rotational speed sensor 16 generates a pulse as a TDC signal pulse at each of predetermined crank angles whenever the crankshaft rotates through 180 degrees, the pulse being supplied to the ECU 5.

A transmission 17 is connected between wheels of a vehicle, not shown, and an output shaft of the engine 1, for transmitting power from the engine 1 to the wheels.

A vehicle speed (VSP) sensor 18 is mounted on one of the wheels, for supplying an electric signal indicative of the sensed vehicle speed VSP to the ECU 5.

An oxygen concentration ($0_2$) sensor 20 is inserted into an exhaust pipe 19 extending from the engine 1, for supplying an electric signal indicative of the sensed oxygen concentration to the ECU 5.

An ignition switch (IGSW) sensor 21 detects an 0N (or closed) state of an ignition switch IGSW, not shown, to detect that the engine 1 is in operation, and supplies an electric signal indicative of the ON state of the ignition switch IGSW to the ECU5.

A fuel tank 23 having a filler cap 22 which is removed for refueling is provided in the vehicle.

The evaporative emission control system 11 is comprised of a canister 26 containing activated carbon 24 as an adsorbent and having an air inlet port 25 provided in an upper wall thereof, an evaporative fuel-guiding pasaage 27 connecting between the canister 26 and the fuel tank 23, and a first control valve 28 arranged across the evaporative fuel-guiding passage 27.

The fuel tank 23 is connected to the fuel injection valves 6 via the fuel pump 8 and the fuel supply pipe 7, and has a umk internal pressure (PT) sensor (hereinafter referred to as "the PT sensor") 29 and a fuel amount (FV) sensor 30, both mounted at an upper wall thereof, and a fuel temperature (TF) sensor 31 mounted at a lateral wall thereof. The PT sensor 29, the FV sensor 30, and the TF sensor 31 are electrically connected to the ECU 5. The PT sensor 29 senses the pressure (tank internal pressure PT) within the fuel tank 23 and supplies an electric signal indicative of the sensed tank internal pressure PT to the ECU 5. The FV sensor 30 senses the volumetric amount of fuel within the fuel tank 23 and supplies an electric signal indicative of the sensed volumetric amount of fuel to the ECU 5. The TF sensor 31 senses the temperature of fuel within the fuel tank 23 and supplies an electric signal indicative of the sensed fuel temperature TF to the ECU 5.

The first control valve 28 is comprised of a two-way valve 34 formed of a positive pressure valve 32 and a negative pressure valve 33, and a first electromagnetic valve 35 formed in one body with the two-way valve 34. More specifically, the first electromagnetic valve 35 has a rod 35a, a front end of which is fixed to a diaphragm phragm 32a of the positive pressure valve 32. Further, the tirst electromagnetic valve 35 is electrically connected to the ECU 5 to have its operation controlled by a signal supplied from the ECU 5. When the first electromagmetic valve 35 is energized, the positive pressure valve 32 of the two-way valve 34 is forcedly opened to open the first control valve 28, whereas when the first electromagnetic valve 35 is deenergized, the valving (opening/closing) operation of the first control valve 28 is controlled by the two-way valve 34 alone.

A purge control valve 36 (second control valve) is arranged across the purging passage 10 extending from the canister 26, which valve has a solenoid, not shown, electrically connected to the ECU 5. The purge control valve 36 is controlled by a signal supplied from the ECU 5 to linearly change the opening thereof. That is, the ECU 5 supplies a desired amount of control current to the purge control valve 36 to control the opening thereof.

A hot wire-type flowmeter (mass flowmeter) 37 is arranged in the purging passage 10 at a location between the canister 26 and the purge control valve 36. The flowmeter 37 has a platinum wire, not shown, which is heated by an electric current and cooled by a gas flow flowing in the purging passage 10 to have its electrical resistance reduced. The flowmeter 37 has an output characteristic variable in dependence on the concentration and flow rate of evaporative fuel flowing in the purging passage 10 as well as on the flow rate of a mixture of evaporative fuel and air being purged through the purging passage 10. The flowmeter 37 is electrically connected to the ECU 5 for supplying an electric signal indicative of the flow rate of the mixture purged through the purging passage 10

A drain shut valve 38 is mounted across the negative pressure communication passage 9 connecting between the air inlet port 25 of the canister 26 and the intake pipe 2, and a second electromagnetic valve 39 is mounted across the negative pressure communication passage 9 at a location downstream of the drain shut valve 38, the drain shut valve 38 and the second electromagnetic valve 39 constituting a third control valve 40.

The drain shut valve 38 has an air chamber 42 and a negative pressure chamber 43 defined by a diaphragm 41. Further, the air chamber 42 is formed of a first chamber 44 accommodating a valve element 44a, a second chamber 45 formed with an air introducing port 45a, and a narrowed communicating passage 47 connecting the second chamber 45 with the first chamber 44. The valve element 44a is connected via a rod 48 to the diaphragm 41. The negative pressure chamber 43 communicates with the second electromagnetic valve 39 via the communication passage 9, and has a spring 49 arranged therein for resiliently urging the diaphragm 41 and hence the valve element 44a in the direction indicated by an arrow A.

The second electromagnetic valve 39 is constructed such that when a solenoid thereof is deenergized, a valve element thereof is in a seated position to allow air to be introduced into the negative pressure chamber 43 via an air inlet port 50, and when the solenoid is energized, the valve element is in a lifted position in which the negative pressure chamber 43 communicates with the intake pipe 2 via the communication passage 9. In addition, reference numeral 51 indicates a check valve.

The ECU 5 comprises an input circuit having the functions of shaping the waveforms of input signals from various sensors, shifting the voltage levels of sensor output signals to a predetermined level, converting analog signals from analog-output sensors to digital signals, and so forth, a central processing unit (hereinafter called "the CPU"), memory means storing programs executed by the CPU and for storing results of calculations therefrom, etc., and an output circuit which outputs driving signals to the fuel injection valves 6, the first and second electromagnetic valves 35, 39, and the purge control valve 36.

Figure 2:
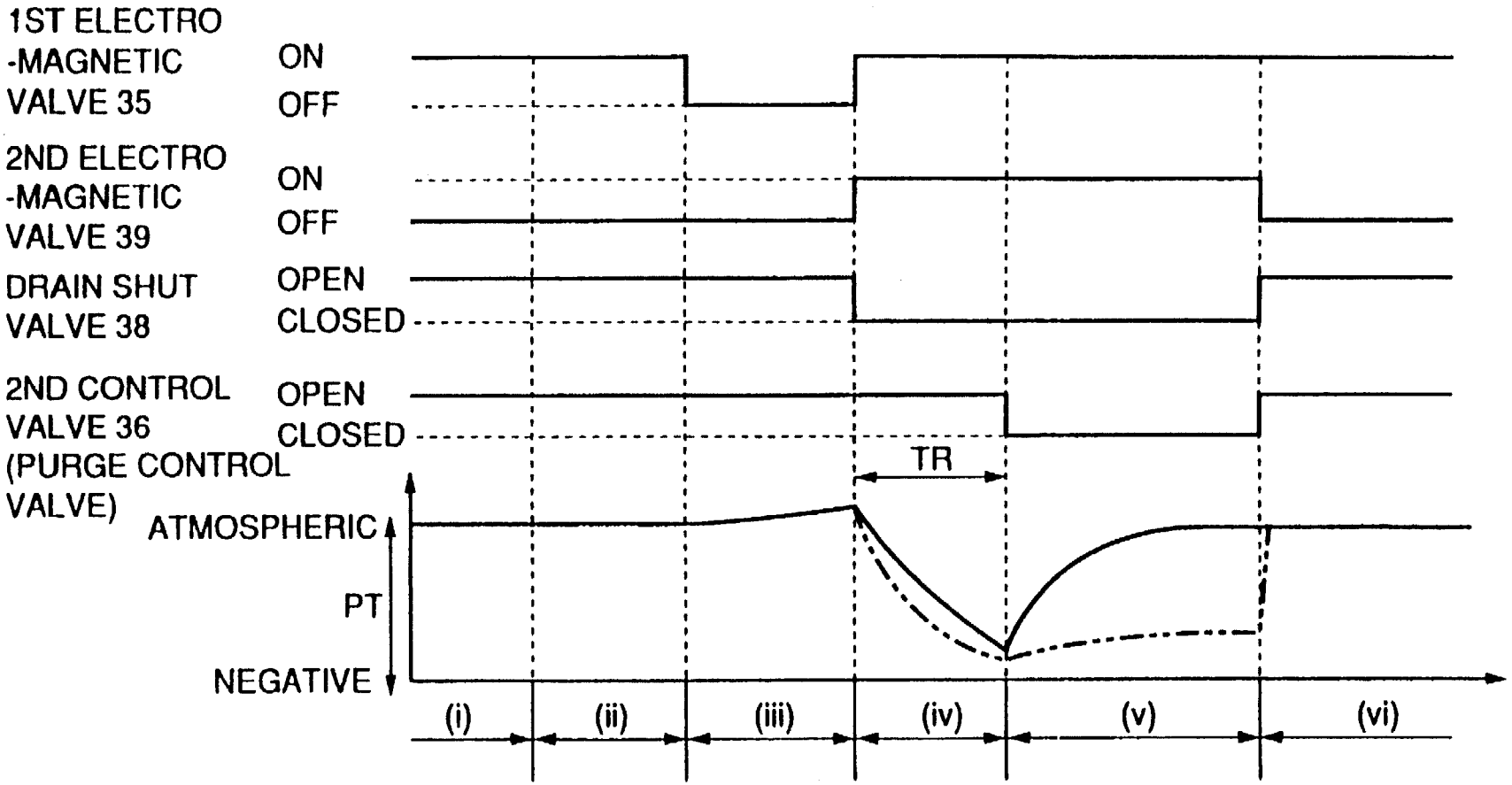
FIG. 2 is a timing chart showing operating patterns of first and second electromagnetic valves, a drain shut valve, and a purge control valve, all appearing in FIG. 1.

FIG. 2 shows patterns of operations of the first and second electromagnetic valves 35, 39, the drain shut valve 38 and the purge control valve 36, and changes in the tank internal pressure PT caused by the operations of the valves. The operations of these valves are commanded by control signals from the ECU 5.

First, during normal operation (normal purging) of the engine, as indicated by (i) in FIG. 2, the first electromagnetic valve 35 is energized and at the same time the second electromagnetic valve 39 is deenergized. When the ignition switch IGSW is closed and the engine is detected to be operating. by the IGSW sensor 18, the purge control valve 36 is energized to open. Then, evaporative fuel generated within the fuel tank 23 is allowed to flow through the evaporative fuel-guiding passage 27 into the canister 26 to be temporarily adsorbed by the adsorbent 24. Since the second electro-magnetic valve 39 is deenergized during normal operation as mentioned above, the drain shut valve 38 is open to allow fresh air to be introduced into the canister 26 through the air inlet port 45a so that evaporative fuel flowing into and stored in the canister 26 is purged together with fresh air through the second control valve 36 into the purging passage 10. On this occasion, if the fuel tank 23 is cooled due to ambient air, etc., negative pressure is developed within the fuel tank 23, which causes the negative pressure valve 33 of the two-way valve 34 to be opened so that part of the evaporative fuel in the canister 26 is returned through the two-way valve 34 into the fuel tank 23.

When predetermined monitoring or abnormality determining conditions are satisfied, hereinafter referred to, the first and second electromagnetic valves 35, 39 and the purge control valve 36 are operated in the following manner to carry out an abnormality diagnosis of the evaporative emission control system 11.

First, the tank internal pressure PT is relieved to the atmosphere, over a time period indicated by (ii) in FIG. 2. More specifically. the first electromagnetic valve 35 is held in the energized state to maintain communication between the fuel tank 23 and the canister 26, and at the same time the second electromagnetic valve 39 is held in the deenergized state to keep the drain shut valve 38 open. Further, the purge control valve 36 is held in the energized state or opened, to relieve the tank internal pressure PT to the atmosphere.

Then, an amount of change in the tank internal pressure PT is measured over a time period indicated by (iii) in FIG. 2.

More specifically, the second electromagnetic valve 39 is held in the deenergized state to keep the drain shut valve 38 open, and at the same time the purge control valve 36 is kept open. However, the first electromagnetic valve 35 is turned off into the deenergized state, to thereby measure an amount of change in the tank internal pressure PT occurring after the interior of the fuel tank 23 has ceased to be open to the atmosphere for the purpose of checking an amount of evaporative fuel generated in the fuel tank 23.

Then, the evaporative emission control system 11 is negatively pressurized over a time period indicated by (iv) in FIG. 2. More specifically, the first electromagnetic valve 35 and the purge control valve 36 are held in the energized state, while the second electromagnetic valve 39 is turned on to close the drain shut valve 38, whereby the evaporative emission control system 11 is negatively pressurized by a gas drawing force developed by negative pressure in the purging passage 10 held in communication with the intake pipe 2. In FIG. 2, symbol TR represents the negative pressunzation time period.

Then, a leak down check is carried out over a time period indicated by (v) in FIG. 2.

More specifically, after the evaporative emission control system 11 is negatively pressurized to a predetermined degree, i.e. after the predetermined negatively-pressurized condition of the system is established, the purge control valve 36 is closed, and then a change in the tank internal pressure PT occurring thereafter is checked by the PT sensor 29. If the system 11 does not suffer from a significant leak of evaporative fuel therefrom, and hence the result of the leak down check shows that there is no substantial change in the tank internal pressure PT as indicated by the two-dot-chain line in the figure, it is determined that the evaporative emission control system 11 is normal, whereas if the system 11 suffers from a significant leak of evaporative fuel therefrom, and hence the result of the leak down check shows that there is a significant change in the tank internal pressure PT toward the atmospheric pressure, as indicated by the solid line, it is determined that the system 11 is abnormal. In this connection, if the evaporative emission control system 11 cannot beBe brought into the predetermined negatively pressurized condition within a predetermined time period, the leak down check is not carried out, as described hereinafter.

After determining whether or not the system 11 is abnormal, the system 11 returns to the normal purging mode, as indicated by (vi) in FIG. 2.

More specifically, while the first electromagnetic valve 35 is held in the energized state, the second electromagnetic valve 39 is deenergized and the purge control valve 36 is opened, to thereby perform normal purging of evaporative fuel. In this state, the tank internal pressure PT is relieved to the atmosphere, and hence is substantially equal to the atmospheric pressure.

Next, the manner of abnormality diagnosis of the evaporative emission control system 11 will be described with reference to FIGS. 3 to 12.

FIG. 3 shows a program for carrying out the abnormality diagnosis of the evaporative emission control system 11, which is executed by the CPU of the ECU 5.

First, at a step S0, it is determined whether or not a zero-point correction of an output value of the PT sensor 9 which senses the tank internal pressure PT of the fuel tank 23 has been carried out. If the zero-point correction has not been carried out, the program proceeds to a step S15, wherein the zero-point correction is carried out, followed by terminating the program. If the zero-point correct has been carried out, the program proceeds to a step S1, wherein a routine of determining permission for monitoring (abnormality determination) is carried out, as described hereinafter. Then, at a step S2, it is determined whether or not the monitoring of the system 11 for abnormality diagnosis is permitted, i.e. a flag FMON is set to "1". If the answer to this question is negative (NO), the first to third control valves 28, 36 40 are set to respective operative states for normal purging mode of the system, followed by terminating the program, whereas if the answer to this question is affirmative (YES), the tank internal pressure PT in the open-to-atmosphere condition of the system is checked at a step S3, and it is determined at a step S4 whether or not this check has been completed. If the answer to this question is negative (NO), the program is immediately terminated, whereas if it is affirmative (YES), the first electromagnetic valve 35 is turned off to check a change in the tank internal pressure PT at a step S5, followed by determining at a step S6 whether or not this check has been completed. If the answer to this question is negative (NO), the program is immediately terminated, whereas if it is affirmative (YES), the first to third control valves 28, 36, 40 are operated at a step S7 to establish the negatively pressurized condition of the evaporative emission control system 11 and the fuel tank 23.

Simultaneously with the start of the negative pressurization at the step S7, a first timer tmPRG incorporated in the ECU 5 is started, and it is determined at a step S8 whether or not the count value thereof is larger than a value corresponding to a predetermined time period T1. The predetermined time period T1 is set to such a value as ensures that the system 11 is negatively pressurized to a predetermined pressure value, i.e. the negatively pressurized condition of the system 11 is established within the predetermined time period T1, if the system is normal. If the answer to the question of the step S8 is affirmative (YES), it is determined that the system 11 cannot be negatively pressurized to the predetermined pressure value due to a hole formed in the fuel tank 23, etc., the program proceeds to a step S12. On the other hand, if the answer to the question of the step S8 is negative (NO), it is determined at a step S9 whether or not the negative pressurization has been completed, i.e. the negatively pressurized condition of the system 11 is established. If the answer to this question is negative (NO), the program is immediately terminated, whereas if it is affirmative (YES), a leak down check routine, described in detail hereinafter, is carried out at a step S10 to check whether or not the system 11 is properly sealed, i.e. it is free from a leak of evaporative fuel therefrom in the normal operating mode thereof. Then, at a step Sll, it is determined whether or not this check has been completed.

If the answer to this question is negative (NO), the program is immediately terminated, whereas if the answer is affirmative (YES), the program proceeds to the step S12.

At the step S12, it is determined whether or not the system 11 is in a normal condition, followed by determining at a step S13 whether the determination of the step S12 has been completed. If the answer to this question is negative (NO), the program is immediately terminated, whereas if it is affirmative (YES), the system 11 is set to the normal purging mode at a step S14, followed by terminating the program.

Next, the above steps will be described in detail hereinbelow:

(1) Zero-Point Correction of Output Value of PT Sensor (at the step S0 in FIG. 3)

FIG. 4 shows a zero-point correction routine for correcting the output value of the PT sensor 29, which is executed as a background processing.

First, at a step S15, it is determined whether or not the engine coolant temperature TW is higher than a predetermined value TWJ, e.g. 20° C. If the answer to this question is affirmative (YES), i.e. if the engine coolant temperature TW is higher than the predetermined value TWJ, the program is immediately terminated without carrying out the zero-point correction of the output value of the PT sensor 29, and a routine for determining permission for the abnormality diagnosis of the system 11, described hereinafter, is executed, whereas if the answer is negative (NO), i.e. if the engine coolant temperature TW is not higher than the predetermined value TWJ, the program proceeds to a step S16, wherein it is determined whether or not a first predetermined time period TSl (e.g. 10 sec.) has elapsed. If the answer to this question is affirmative (YES), the program is immediately terminated without carrying out the zero-point correction of the output value of the PT sensor 29, and the routine for determining permission for the abnormality diagnosis of the system 11 is executed. If the answer to the question of the step S16 is negative (NO), the program proceeds to a step S17 et seq. to carry out the zero-point correction. That is, after the ignition switch IGSW is turned on and the engine 1 is detected by the IGSW sensor 18 to be operating, the temperature of fuel increases due to its circulation between the engine 1 and the fuel tank 23, and accordingly evaporative fuel is generated. In the present embodiment, by carrying out the zero-point correction of the output value of the PT sensor 29 immediately after the start of the engine 1 when the amount of evaporative fuel generated is not so large, the zero-point correction can be made with accuracy without being affected by changes in the tank internal pressure PT due to generation of evaporative fuel therein.

At the step S17, the purge control valve 36 is closed. This is to prevent a change in the pressure within the fuel tank 23 which will occur if purging of evaporative fuel from the canister 26 into the intake system is effected. At the next step S18, the first electromagnetic valve 35 is energized to open the first control valve 28 so that communication is established between the fuel tank 23 and the canister 26. Then, at a step S19, the second electromagnetic valve 39 is deenergized to open the drain shut valve 38 to make the interior of the system 11 open to the atmosphere, in order to prevent a change in the tank internal pressure due to generation of evaporative fuel therein. Thus, the pressure within the fuel tank 23 becomes equal to the atmospheric pressure.

After execution of the step S19, it is determined at a step S20 whether or not a second predetermined time period TS2 (e.g. 4 sec.) within which the pressure within the fuel tank 23 can become stable has elapsed. If the second predetermined time period TS2 has elapsed, the zero-point correction of the output value of the PT sensor 29 is carried out at a step S20'. More specifically, upon the lapse of the second predetermined time period TS2, a value PTO of the pressure within the fuel tank 23 then assumed is detected by the PT sensor 29 and stored into the memory means within the ECU 5 as a reference value corresponding to the point of inflection between the positive pressure side and the negative pressure side. The zero-point correction is made with reference to the reference value PTO thus stored. Output values subsequently generated by the PT sensor 29 are corrected by the ECU 5, e.g. by subtracting the stored reference value PT0 from the output values of the PT sensor 29, to thereby enable accurate determination of abnormality of the evaporative emission control system 11. Then, at a step S20", a check-over flag is set, followed by terminating the program.

In addition, a learned value (e.g. average value) of pressure values output in the past by the PT sensor 29 may be used as the reference value for the zero-point correction, in place of the output pressure value PT0 corresponding to the point of injection between the positive pressure side and the negative pressure side.

FIG. 4A shows a flowchart showing pan of a zero-point correction routine according to another embodiment of the invention, wherein an average value of the output pressure PT (leaned value) is used as the reference value for the zero-point correction. Steps, not shown, in the figure are identical with the steps S15–S20 in FIG. 4.

When it is determined at the step S20 that the predeterimed time period TS2 has elapsed, an average value PTAVE of the output pressure value PT detected by the PT sensor 29, based upon the PT0 value detected upon the lapse of the predetermined time period TS2, by the use of the following equation (1):

$$PTAVE=PT\times(CAVE/A)+PTAVE\times(A-CAVE) \quad (1)$$

where A represents a constant value, CAVE a variable which is set to a suitable value within a range of 1 to A, and PTAVE' an average value of PT obtained on the last occasion.

The average value PTAVE calculated as above is stored into the memory means of the ECU 5 and used as the reference value by which the output value of the PT sensor 29 subsequently obtained is corrected, similarly to the case where the PTO value is used as the reference value. By using the average value PTAVE, the zero-point correction can be made with higher accuracy in a manner being much less affected by a deviation of the output value PT sensor 29 due to noise, fluctuations in the tank internal pressure, etc.

Further, to determine whether or not the engine 1 has been started in a cold state, the temperature of fuel within the fuel tank 23 detected by the TF sensor 31 rosy be compared with a predetermined value at the step S15, in place of the engine coolant temperature TW. If the fuel temperature is used, in the case where the zero-point correction is made by the use of a correction coefficient corresponding to the point of inflection, the value of the correction coefficient needs to be set to a different value from one set if the engine coolant temperature TW is used.

(2) Determination of Permission for Monitoring the step S1 of FIG. 3)

FIG. 5 shows a routine for determining whether or not monitoring of the system 11 for abnormality diagnosis thereof is permitted. This routine is executed as a background processing.

At a step S21, it is determined whether or not a value TWST of the engine coolant temperature TW detected at the start of the engine 1 is lower than a predetermined value TWX. The abnormality diagnosis of the present embodiment has only to be carried out only after the engine has been out of operation for a long time period (e.g. once per day). First, when the ignition switch IGSW is closed, the engine coolant temperature TW is detected at the start of the engine and read in, and the read TW value is stored into the memory means as the value TWST. It is determined at the step S21 in the present routine whether or not the engine coolant temperature TW is lower than the predetermined value TWX, e.g. 20° . If the answer to this question is affirmative (YES), i.e. if the engine coolant temperature TW detected at the start of the engine is lower than the predetermined value TWX, the program proceeds to a step S22, wherein it is determined whether or not the engine coolant temperature TW detected by the TW sensor 15 falls between a predetermined lower limit value TWL (e.g. 50° C.) and a predetermined higher limit value TWH (e.g. 90° C.). If the answer to this question is affirmative (YES), it is determined at a step S23 whether or not the intake air temperature TA detected by the TA sensor 14 falls between a predetermined lower limit value TAL (e.g. 70° C.) and a predetermined higher limit value TAH (e.g. 90° C.). If the answer to this question is affirmative (YES), it is determined that the engine 1 is being warmed up, and then the program proceeds to a step S24.

At the step S24, it is determined whether or not the engine rotational speed NE detected by the NE sensor 16 falls between a predetermined lower limit value NEL (e.g. 2000 rpm) and a predetermined higher limit value NEH (e.g. 4000 rpm). If the answer to this question is affirmative (YES), it is determined at a step S25 whether or not the intake pipe absolute pressure PBA detected by the PBA sensor 13 falls between a predetermined lower limit value PBAL (e.g. 350 mmHg) and a predetermined higher limit value PBAH (e.g. −150 mmHg). If the answer to this question is affirmative (YES), it is determined at a step S26 whether or not the throttle valve opening θTH detected by the θTH sensor 4 falls between a predetermined lower limit value θTHL (e.g. 1°) and a predetermined higher limit value θTHH (e.g. 5°) If the answer to this question is affirmative (YES), it is determined at a step S27 whether or not the vehicle speed VSP detected by the VSP sensor 21 falls between a predetermined lower limit value VSPL (e.g. 53 km/hr) and a predetermined higher limit value VSPH (e.g. 61 km/hr). If the answer to this question is affirmative (YES), it is determined that the engine 1 is being warmed up and stable in operation, and then the program proceeds to a step S28. At the step S28, it is determined whether or not the vehicle is cruising. This determination is made by determining whether or not a variation in the vehicle speed has continuously been within a range of ±0.8 km/sec. over a predetermined time period (e.g. 2 sec.). If the answer to this question is affirmative (YES)), it is determined at a step S29 whether or not purging of evaporative fuel has been carried out over a predetermined time period. More specifically, in the case where a large mount of evaporative fuel is stored in the canister 26, it takes a longer time period to establish the negatively pressurized condition of the system 11 due to the resulting large resistance of the canister 26 to permeation of gases, or there is a fear that undesirably rich evaporative fuel is purged into the intake system during the negative pressurization. Therefore, in the present embodiment, monitoring of the evaporative emission control system 11 is carried out only after the purging of evaporative fuel has been carried over the predetermined time period, to reduce the amount of evaporative fuel adsorbed and stored in the canister 26.

If the answer to the question of the step S29 is affirmative (YES), the flag FMON is set to "1" at a step S30 for permitting monitoring of the system 11 for abnormality diagnosis, followed by terminating the program. On the other hand, if at least one of the answers to the questions of the steps S21 to S30 is negative (NO), the conditions for permitting monitoring are not satisfied, so that the flag FMON is set to "0" at a step S31, followed by terminating the program.

(3) Check of Tank Internal Pressure in Open-to-Atmosphere Condition (at the step S3 in FIG. 3)

Figure 6:
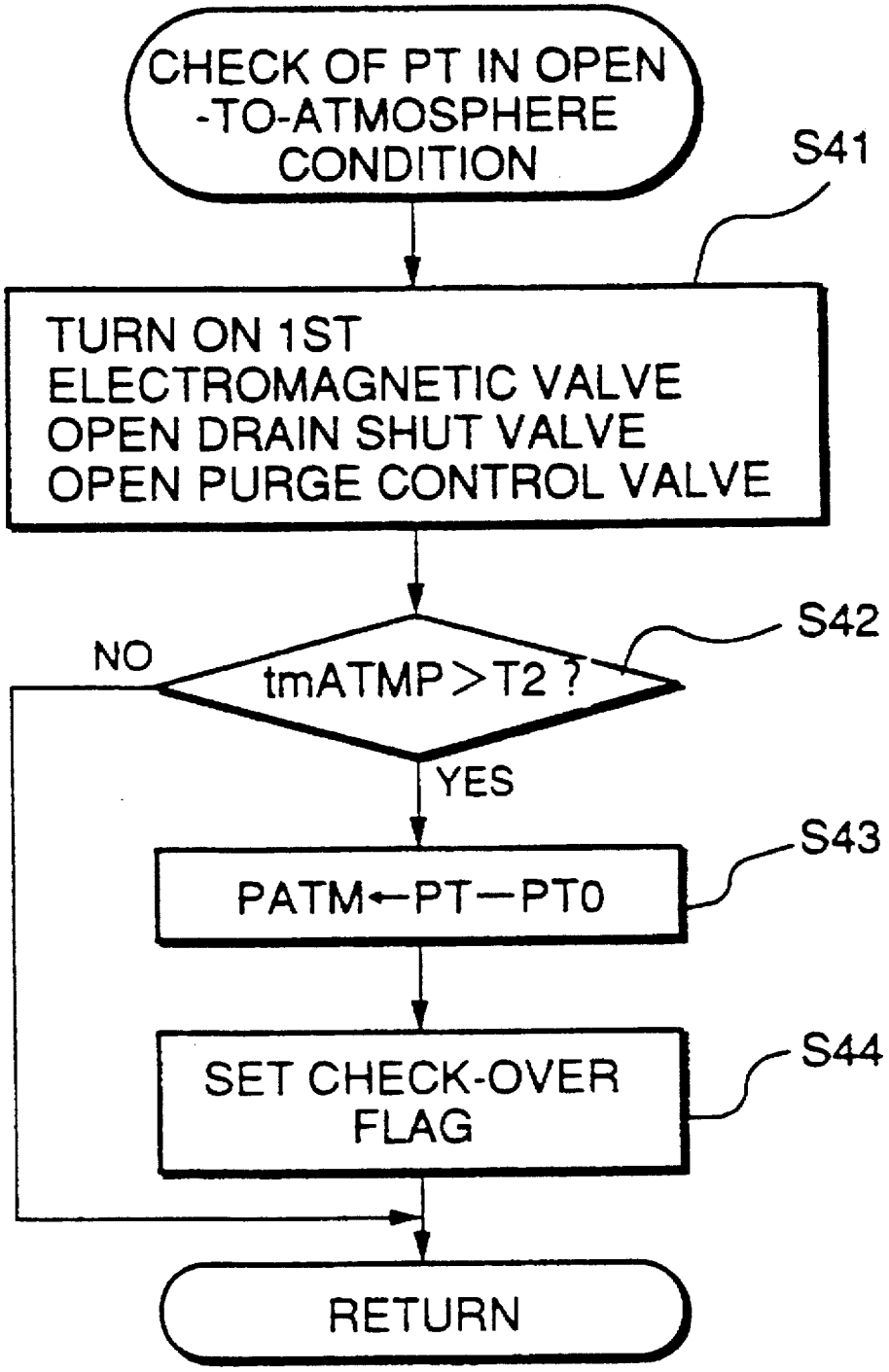

FIG. 6 shows a routine for carrying out the tank internal pressure check in the open-to-atmosphere condition, which is also executed as a background processing.

First, at a step S41, the system 11 is set to the open-to-atmosphere mode, and at the same time, a second timer tmATMP is reset and started. More specifically, the first electromagnetic valve 35 is held in the energized state, and at the same time the second electromagnetic valve 39 is held in the aleenergized state to keep the drain shut valve 38 open. Further, the purge control valve 36 is kept open. Thus, the tank internal pressure PT is relieved to the atmosphere (see the time period indicated by (ii) in FIG. 2).

Then, at a step S42, it is determined whether or not the count value of the second timer tmATMP is larger than a value corresponding to a predetermined time period T2. The predetermined time period T2 is set to a value, e.g. 4 sec., which ensures that the pressure within the system 11 has been stabilized upon lapse thereof. If the answer to this question is negative (NO), the program is immediately terminated, while if it is affirmative (YES), the progrin proceeds to a step S43, wherein the tank internal pressure PT in the open-to-atmosphere condition is detected by the PT sensor 29, and a value PATM obtained by subtracting the zero-point pressure value PT0 from the detected pressure value PT is stored into the ECU 5, and then a check-over flag is set at a step S44, followed by terminating the program.

(4) Check of A Change in Tank Internal Pressure (at the step S5 in FIG. 3)

FIG. 7 shows a routine for checking a change in the tank internal pressure, which is executed as a back-ground processing.

First, at a step S51, the system 11 is set to a PT change-checking mode, and at the same time a third timer tmTP is reset and started. More specifically, while the purge control valve 36 and the drain shut valve 38 are held open, the first electromagnetic valve 35 is turned off to thereby set the system to the PT change checking mode (see the time period indicated by (iii) in FIG. 2).

Then, at a step S52, it is determined whether or not the count value of the third timer tmTP is larger than a value corresponding to a third predetermined time period T3, e.g. 10 sec. If the answer to this question is negative (NO), the program is immediately terminated, whereas if it is affLrmative (YES), the tank internal pressure PT is detected after the lapse of the predetermined time period T3, and a value PCLS obtained by subtracting the zero-point pressure value PTO from the detected value PT is stored into the ECU 5 at a step S53, followed by calculation of a first rate of change PVARIA in the tank internal pressure by the use of the following equation (2):

$$PVARIA=(PCLS-PATM)/T3 \quad (2)$$

Then, the first rate of change PVARIA thus calculated is stored into the ECU 5 and a check-over flag is set at a step S55, followed by terminating the program.

(5) Negative Pressurization (at the step S7 in FIG. 3)

Figure 8:
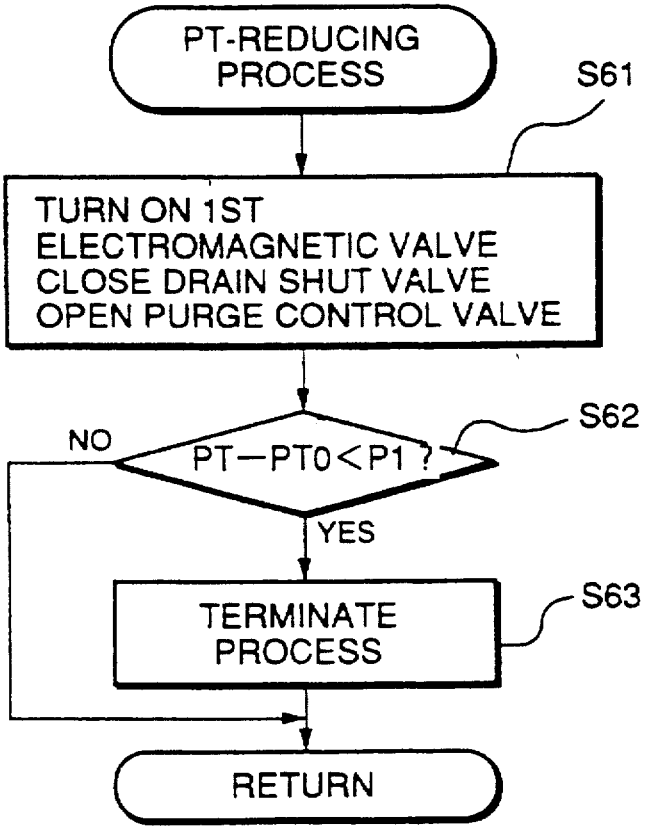

FIG. 8 shows a routine for carrying out a process of negatively pressurizing the system 11 to establish the negatively-pressurized condition of the system, which is executed as a background processing.

First, at a step S61, the system 11 is set to a negatively-pressurizing mode. More specifically, the purge control valve 36 is kept open, and at the same time the first electromagnetic valve 35 is turned on, and the second electromagnetic valve 39 is turned on to close the drain shut valve 38 (see the time period indicated by (iv) in FIG. 2). In this state, the system 11 is negatively pressurized to a predetermined value by a gas-drawing force created by operation of the engine 1. Then, it is determined at a step S62 whether or not a value PCHK of the tank internal pressure which is obtained by subtracting the zero-point pressure value PT0 from a tank internal pressure value PT detected in this mode of the system 11 is lower than a predetermined negative value Pl (e.g. −20° mmHg). If the answer to this question is negative (NO), the program is immediately terminated, whereas if it becomes affirmative (YES), a process-over flag is set at a step S63, followed by terminating the program.

(6) Leak Down Check (at the step S10 in FIG. 3)

FIG. 9 shows a routine for performing a leak down check of the system 11, which is executed as a background processing.

First, at a step S71, the system 11 is set to a leak down check mode. More specifically, while the first electromagnetic valve 35 is held in the energized state, and at the same time the drain shut valve 38 is kept closed, the purge control valve 36 is closed to cut off the communication between the system 11 and the intake pipe 2 of the engine 1 (see the time period (v) in FIG. 2).

Then, the program proceeds to a step S72, wherein it is determined whether or not a value PST has been calculated by subtracting the zero-point pressure value PT0 from a tank internal pressure value PT detected at the start of the leak down check. In the first execution of this step S72, the answer to this question is negative (NO), so that the program proceeds to a step S73, wherein the tank internal pressure PST is calculated and a fourth timer tmLEAK is reset and started.

Then, it is determined at a step S74 whether the count value of the fourth timer tmLEAK is larger than a value corresponding to a fourth predetermined time period T4 (e.g. 10 sec.). In the first execution of this step S72, the answer to this question is negative (NO), so that the program is immediately terminated.

In the following loop, the answer to the question of the step S72 becomes affirmative (YES), so that the program jumps over to the step S74, wherein it is determined whether or not the count value of the fourth timer tmLEAK is larger than the value corresponding to the predetermined time period T4. If the answer to this question is negative (NO), the program is immediately terminated, whereas if it becomes affirmative (YES), a value PEND is calculated by subtracting the zero-point pressure value PT0 from a tank internal pressure value PT detected at the end of the leak down check and stored into the memory means of the ECU 5 at a step S75, followed by calculation of a second rate of change PVARIB in the tank internal pressure PT at a step S76 by the use of the following equation (3):

$$PVARIB=(PEND-PST)/T4 \quad (3)$$

The second rate of change PVARIB in the tank internal pressure PT thus calculated is stored into the memory means of the ECU 5, and a check-over flag is set at a step S77, followed by terminating the program.

(7) System Condition-Determining Process (at the step S12 in FIG. 3)

FIG. 10 shows a routine for carrying out a process of determining a condition of the system 11, which is executed as a background processing.

First, at a step S81, it is determined whether or not the count value of the first timer tmPRG exceeded the value corresponding to the predetermined value Tl during the negatively-pressurizing process. If the answer to this question is affirmative (YES), it is determined that the system 11 may suffer from a significant leak of evaporative fuel due to a hole formed in the fuel tank 23, etc., so that the program proceeds to a step S82, where it is determined whether or not the first rate of change PVARIA in the tank internal pressure PT is larger than a predetermined value P2. If the answer to this question is negative (NO), which means that evaporative fuel was not generated at a large rate in the fuel tank 23 so that the predetermined negatively pressurized condition of the system 11 could have been properly established in the negatively-pressurizing process if the system 11 had been in a normal condition, it is determined that the system 11 suffers from a significant leak of evaporative fuel from the fuel tank 23, piping connections, etc. determining that the evaporative emission control system 11 is abnormal, and then a process-over flag is set at a step S86. followed by terminating the program. On the other hand, if the answer to the question of the step S82 is affirmative (YES), which means that evaporative fuel was generated at a large rate in the fuel tank 23 to increase the tank internal pressure PT, which prevented the system 11 from being negatively pressurized in a proper manner in the negatively-pressurizing process, the determination of the system condition is suspended at a step S84, and then the process-over flag is set at the step S86, followed by terminating the program.

On the other hand, if the answer to the question of the step S81 is negative (NO), i.e. if the system 11 was negatively pressurized to the predetermined value, an abnormality-determining routine is earned out at a step S85, and then the process-over flag is set at the step S86, followed by terminating the program.

The abnormality-determining routine carried out at the step S85 is shown by way of example in FIG. 11.

First, it is determined at a step S91 whether or not the difference between the second change of rate PVARIB in the tank internal pressure PT and the first rate of change PVARIA in the same is larger than a predetermined value P3.

More specifically, in order to determine whether a main factor which has determined the rate of change PVARIB in the tank internal pressure PT is faulty sealing of the system 11, which means that there occurs a significant leak of evaporative fuel from the system 11 in the normal operating mode thereof, or generation of evaporative fuel from the fuel tank 23, it is determined whether or not the difference between the second rate of change PVARIB and the fast rate of change PVARIA is larger than the predetermined value P3. If the second rate of change PVARIB assumes a large value due to generation of a large amount of evaporative fuel from the fuel tank 23, the answer to the question of the step S91 is negative (NO), whereas if the second rate of change PVARIB assumes a large value due to the faulty sealing of the system 11, the answer is affirmative (YES). The predetermined value P3 is set according to the time period TR required for establishing the negatively pressurized condition of the system 11 in a manner as shown in FIG. 12. More specifically, the predetermined value P3 is set to a value P31 when the time period TR is longer than a predetermined value TR1, whereas it is set to a value P32(>P31) when the time period TR is shorter than the predetermined value.

If the answer to the question of the step S91 is affirmative (YES), it is determined at a step S92 that the evaporative emission control system 11 is abnormal, whereas if the answer is negative (NO), it is determined at a step S93 that the system 11 is normal, followed by terminating the program.

FIG. 13 shows another example of the abnormality determining routine.

First, at a step S101, it is determined whether or not the fuel amount FV in the fuel tank 23 detected by the FV sensor 30 is larger than a first predetermined value FV1, to determine whether or not the fuel tank 23 is substantially fully filled with fuel. If the answer to this question is affirmative (YES), a map [I] is selected, whereas if the answer is negative (NO), it is determined at a step S103 whether or not the fuel amount FV is larger than a second predetermined value FV2, to determine whether or not the fuel tank 23 is filled half or more with fuel. If the answer to this question is affirmative (YES), a map [II] is selected at a step S104, whereas if the answer is negative (NO), a map [III] is selected at a step S105.

Then, the abnormality determination is carried out by the use of a selected one of the maps [I] to [III], followed by terminating the program.

More specifically, as shown in FIGS. 24 [I]–[III], the maps [I] to [III] are each set such that a normal region and an abnormal region are defined in a manner depending on the relationship between the first rate of change PVARIA in the tank internal pressure PT and the second rate of change PVARIB in the tank internal pressure PT. By retrieving the selected one of the maps, it is determined whether or not the system 11 is normal. In the figures, the hatched sections indicate the abnormal regions.

(8) Normal Purging (at the step S14 in FIG. 3)

FIG. 15 shows a routine for restoring the normal purging mode of the system 11, in which the operative states of the valves are specified.

More specifically, the first electromagnetic valve 35 is held in the energized state and the dram shut valve 39 and the purge control valve 36 are opened to thereby set the system to the normal purging mode, at a step S111, followed by terminating the program.

What is claimed is:

1. A tank internal pressure-detecting device for an internal combustion engine having a fuel tank, an intake system, and an evaporative emission control system for controlling purging of evaporative fuel generated in said fuel tank into the intake system, comprising:

tank internal pressure-detecting means arranged in said fuel tank for detecting pressure within said fuel tank;

purging interrupting means for interrupting purging of said evaporative fuel by said evaporative emission control system for a predetermined period of time after said engine is started;

opening means for opening an interior of said fuel tank to the atmosphere;

memory means for storing a value of said pressure within said fuel tank detected by said tank internal pressure-detecting means as a reference value while said purging interrupting means is interrupting said purging of said evaporative fuel into said intake system and at the same time said opening means opens said interior of said fuel tank to the atmosphere; and correcting means for correcting an output value of said tank internal pressure-detecting means, based upon said reference value stored in said memory means.

2. A tank internal pressure-detecting device as claimed in claim 1, including inhibiting means for inhibiting operations of said purging interrupting means, said opening means and said memory means when a temperature of said engine is higher than a predetermined value.

3. A tank internal pressure-detecting device as claimed in claim 1, wherein said memory means stores said value of said pressure within said fuel tank detected by said rank internal pressure-detecting means as said reference value, when a second predetermined period of time has elapsed after said opening means started to open said interior of said fuel tank.

4. A tank internal pressure-detecting device for an internal combustion engine having a fuel tank, an intake system, and an evaporative emission control system having a canister having an air inlet port formed therein, an evaporative fuel-guiding passage extending between said fuel tank and said canister, a first control valve arranged across said evaporative fuel-guiding passage for closing and opening said passage, a purging passage extending between said canister and said intake system, a second control valve arranged across said purging passage for closing and opening said purging passage, and a third control valve arranged at said air inlet port of said canister for closing and opening said air inlet port, said tank internal pressure-detecting device comprising:

tank internal pressure-detecting means for detecting pressure within said fuel tank;

valve control means for opening said first and third valves and at the same time closing said second control valve for a predetermined period of time after said engine is started;

memory means for storing a value of said pressure within said fuel tank detected by said tank internal pressure-detecting means as a reference value while said valve control means opens said first and third control valves and closes said second control valve; and correcting means for correcting an output value of said tank internal pressure-detecting means, based upon said reference value stored in said memory means.

5. A tank internal pressure-detecting device as claimed in claim 4, including inhibiting means for inhibiting operation of said valve control means when a temperature of said engine is higher than a predetermined value.

6. A tank internal pressure-detecting device as claimed in claim 4, wherein said memory means stores said value of said pressure within said fuel tank detected by said tank internal pressure-detecting means as said reference value, when a second predetermined period of time has elapsed after said opening means started to open said interior of said fuel tank after said value control means started said opening of said first and third control valves and said closing of said second control valve.

7. A tank internal pressure-detecting device as claimed in claim 1, wherein said memory means stores a learned value of values of said pressure within said fuel tank detected by said tank internal pressure-detecting means as said reference value.

8. A tank internal pressure-detecting device as claimed in claim 4, wherein said memory means stores a learned value of values of said pressure within said fuel tank detected by said tank internal pressure-detecting means as said reference value.

*9. A pressure-detecting device for an internal combustion engine having a fuel tank, an intake system, and an evaporative emission control system for controlling purging of evaporative fuel generated in said fuel tank into the intake system, comprising:*

*pressure-detecting means arranged in said evaporative emission control system for detecting pressure within said evaporative emission control system;*

*purging interrupting means for interrupting purging of said evaporative fuel by said evaporative emission control system for a predetermined period of time after said engine is started;*

*opening means for opening an interior of said evaporative emission control system to the atmosphere;*

*memory means for storing a value of said pressure within said evaporative emission control system detected by said pressure-detecting means as a reference value while said purging interrupting means is interrupting said purging of said evaporative fuel into said intake system and at the same time said opening means opens said interior of said evaporative emission control system to the atmosphere; and*

*correcting means for correcting an output value of said pressure-detecting means, based upon said reference value stored in said memory means.*

*10. A pressure-detecting device as claimed in claim 9, including inhibiting means for inhibiting operations of said purging interrupting means, said opening means and said memory means when a temperature of said engine is higher than a predetermined value.*

*11. A pressure-detecting device as claimed in claim 9, wherein said memory means stores said value of said pressure within said evaporative emission control system detected by said pressure-detecting means as said reference value, when a second predetermined period of time has elapsed after said opening means started to open said interior of said evaporative emission control system.*

*12. A pressure-detecting device for an internal combustion engine having a fuel tank, an intake system, and an evaporative emission control system having a canister having an air inlet port formed therein, an evaporative fuel-guiding passage extending between said fuel tank and said canister, a first control valve arranged across said evaporative fuel-guiding passage for closing and opening said passage, a purging passage extending between said canister and said intake system, a second control valve arranged across said purging passage for closing and opening said purging passage, and a third control valve arranged at said air inlet port of said canister for closing and opening said air inlet port, said pressure-detecting device comprising:*

*pressure-detecting means for detecting pressure within said evaporative emission control system;*

*valve control means for opening said first and third valves and at the same time closing said second control valve for a predetermined period of time after said engine is started;*

*memory means for storing a value of said pressure within said evaporative emission control system detected by said pressure-detecting means as a reference value while said valve control means opens said first and third control valves and closes said second control valve; and*

*correcting means for correcting an output value of said pressure-detecting means, based upon said reference value stored in said memory means.*

*13. A pressure-detecting device as claimed in claim 12, including inhibiting means for inhibiting operation of said valve control means when a temperature of said engine is higher than a predetermined value.*

*14. A pressure-detecting device as claimed in claim 12, wherein said memory means stores said value of said pressure within said evaporative emission control system detected by said pressure-detecting means as said value, when a second predetermined period of time has elapsed after said opening means started to open said interior of said evaporative emission control system after said value control means started said opening of said first and third control*

*valves and said closing of said second control valve.*

*15. A pressure-detecting device as claimed in claim 9, wherein said memory means stores a learned value of values of said pressure within said evaporative emission control system detected by said pressure-detecting means as said reference value.*

*16. A pressure-detecting device as claimed in claim 12, wherein said memory means stores a learned value of values of said pressure within said evaporative emission control system detected by said pressure-detecting means as said reference value.*

* * * * *